United States Patent [19]

Kondo

[11] Patent Number: 4,788,589
[45] Date of Patent: Nov. 29, 1988

[54] METHOD AND APPARATUS FOR TRANSMITTING VIDEO DATA

[75] Inventor: Tetsujiro Kondo, Kanagawa, Japan

[73] Assignee: Sony Corporation, Tokyo, Japan

[21] Appl. No.: 934,804

[22] Filed: Nov. 25, 1986

[30] Foreign Application Priority Data

Nov. 30, 1985 [JP] Japan .............................. 60-270554

[51] Int. Cl.⁴ .............................................. H04N 7/12
[52] U.S. Cl. ..................................... 358/133; 358/313
[58] Field of Search ............... 358/133, 135, 136, 313; 360/11.1

[56] References Cited

U.S. PATENT DOCUMENTS 3,736,373  5/1973  Pease .................................... 358/136
4,641,202  2/1987  Nakamura et al. ............ 360/11.1 X
4,703,351 10/1987  Kondo ............................ 358/133 X Primary Examiner—Howard W. Britton
Assistant Examiner—Victor R. Kostak
Attorney, Agent, or Firm—Lewis H. Eslinger; Donald S. Dowden

[57] ABSTRACT

Disclosed is an apparatus for transmitting video signals comprising an input device for receiving video data of sequential fields a memory for storing the video data of a plurality of fields, parameter generating devices for generating respective parameters to specify a time spatial relation which is defined by a linear combination from reference pixel data of a plurality of fields to be periodically transmitted every predetermined number of fields and pixel data of a respective field to be skipped between the plurality of fields to be periodically transmitted each being stored in memory. Means are provided for transmitting the video data of the fields to be periodically transmitted every predetermined number of fields and the respective parameters instead of the video data of the respective field to be skipped.

12 Claims, 4 Drawing Sheets

METHOD AND APPARATUS FOR TRANSMITTING VIDEO DATA

BACKGROUND OF THE INVENTION

1. Field of the Invention

The present invention relates to an apparatus for transmitting video data and a method thereof.

2. Description of the Related Art

Where image data containing a large quantity of information, such as television signals is transmitted, one data compression method is known in this technical field wherein the predetermined frame data of the television signal is skipped. In the receiver end, the frame data which is not transmitted is interpolated by utilizing the actually transmitted frame data. A variety of data interpolation methods have been widely utilized. For instance, the pixel data of the frame which is not transmitted may be substituted by the corresponding pixel data of the preceding frame, and furthermore, such pixel data may be substituted by the averaged value of the corresponding pixel data of the preceding and succeeding frames.

The particular drawbacks, however, exist in that serious deterioration appears in reproduced images of moving portions, causing image blurs. Although there is another interpolation method of obtaining movement vectors to transmit them, conspicuous image deterioration is present around edge portions of the moving object.

SUMMARY OF THE INVENTION

It is therefore an object of the invention to provide a method for transmitting image data whose data quantity can be compressed, and a data transmission apparatus thereof.

Another object of the invention is to provide a method for reproducing either a frame or a field of image data which is not transmitted, at the receiver end with better data conditions, and a data transmission apparatus thereof.

Still another object of the invention is to provide a method of reproducing images at the receiver end, which can represent various kinds of movement by a plurality of moving objects, and moreover, have no blur at end portions thereof and no problem of an uncovered background, and also to provide a data transmission apparatus thereof.

A further object of the invention is to provide a method of transmitting data without block distortions and a data transmission apparatus thereof.

A video data transmission apparatus according to the invention comprises:

input means for receiving video data of sequential fields;

memory means for storing the video data of a plurality of fields;

parameter generating means for generating respective parameters to specify a time spatial relation which is defined by a linear combination from reference pixel data of a plurality of fields to be periodically transmitted every predetermined number of fields and pixel data of a respective field to be skipped between said plurality of fields to be periodically transmitted each being stored in said memory means; and means for transmitting the video data of said fields to be periodically transmitted every said predetermined number of fields and said respective parameters instead of the video data of said respective field to be skipped.

A method for transmitting video data according to the invention comprises the steps of:

receiving video data of sequential fields;

storing the video data of a plurality of fields;

generating respective parameters to specify a time spatial relation which is defined by a linear combination from reference pixel data of a plurality of fields to be periodically transmitted every predetermined number of fields and pixel data of a respective field to be skipped between said plurality of fields to be periodically transmitted, and transmitting the video data of said fields to be periodically transmitted every said predetermined number of fields and said respective parameters instead of the video data of said respective field to be skipped.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF PREFERRED EMBODIMENT

Figure 1:
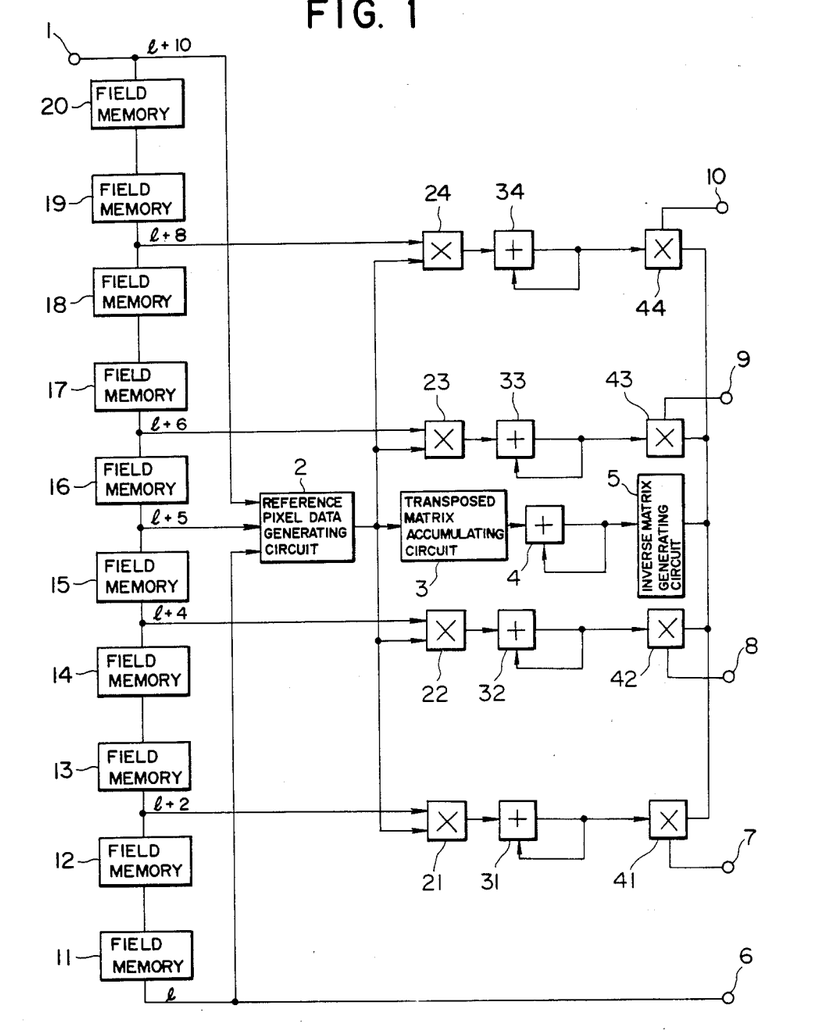
FIG. 1 is a schematic block diagram of an arrangement of a data transmitter according to one preferred embodiment of the invention.

FIG. 1 shows a block diagram of an encoding apparatus provided at a transmitter end according to one preferred embodiment of the invention.

The encoding apparatus includes a memory having a memory capacity corresponding to a period of video data to be skipped, and a circuit for identifying parameters from reference data derived from this memory.

In the encoding apparatus shown in FIG. 1, a television signal digitized at a predetermined sampling frequency is supplied to an input terminal indicated by reference numeral 1. Ten (10) field memories 11 to 20 corresponding to the period of the video data to be skipped are cascade-connected to the input terminal 1. In the preferred embodiment, the respective periods of the odd field and even field are selected to be nine (9) fields.

Figures 2A, 2B:
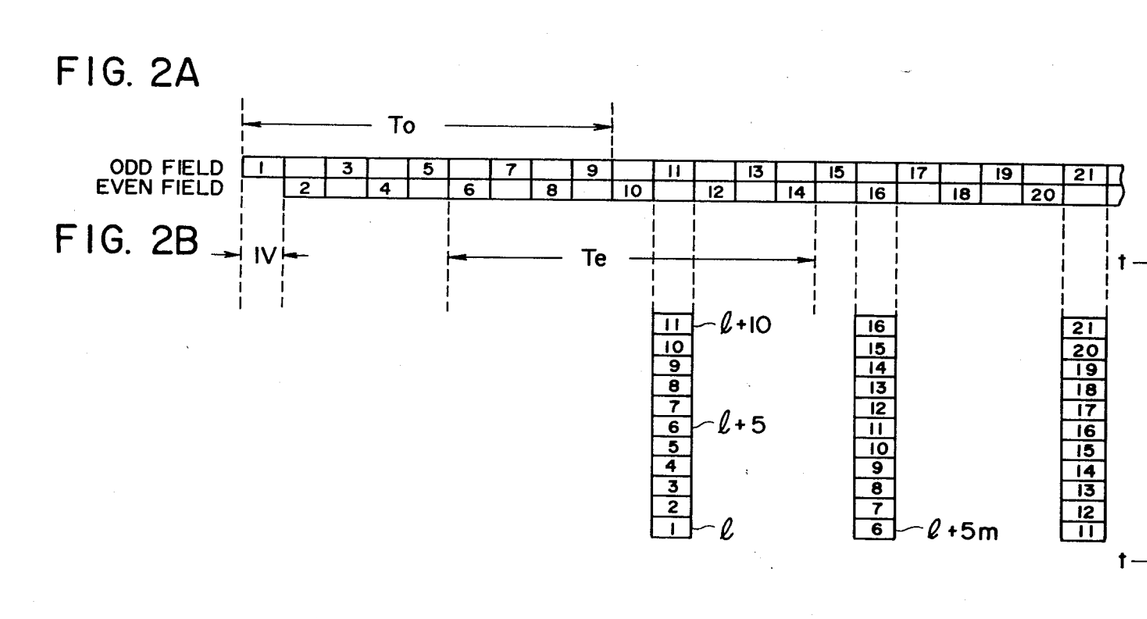
FIGS. 2A and 2B, FIGS. 3A through 3D and FIG. 4 are illustrations for explaining operations of the data transmitter shown in FIG. 1.

When the digital television signal constructed of sequential fields containing a first odd television field as a first television field as illustrated in FIG. 2A is supplied to the input terminal 1, the respective field data signals from the first to tenth fields appear at the output of the field memories 11 to 20, as shown in FIG. 2B, when an eleventh field data signal is supplied to the input terminal 1.

In FIG. 2A, a symbol "To" (equal to 9 fields) corresponds to a period of the video data to be skipped for the odd field, whereas another symbol "Te" corresponds to one for the even field. The data signal of the first fields in the periods of the video data to be skipped (e.g., the first field, sixth field, eleventh field and sixteenth field) is transmitted as it is without compression. Accordingly, the fields to be transmitted are those denoted by "l", l+5, l+10, and l +5 m, where "l" indicates initial fields and "m" represents an integer. As shown in FIG. 2B, when the data signal of the eleventh field is supplied to the input terminal 1, the data signal of the first field is output from the field memory 11.

These field data signals to be transmitted are supplied to a reference pixel data generating circuit 2. The reference pixel data generating circuit 2 is a circuit for extracting neighbor 40 reference pixel data from the data signals of the field to be transmitted with respect to each of respective pixels of the k-th field to be skipped. The reference pixel data extracted by the reference pixel data generating circuit 2 is supplied to a transposed matrix accumulating circuit 3 and multiplying circuits 21 to 24, respectively.

Figure 3A:
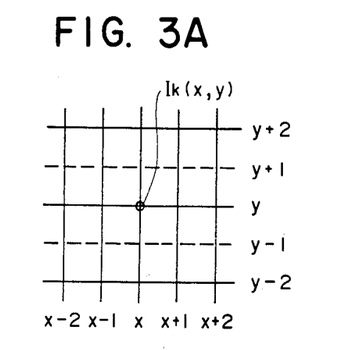
Figure 3B:
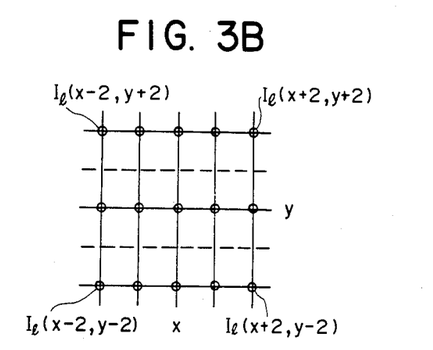
Figure 3C:
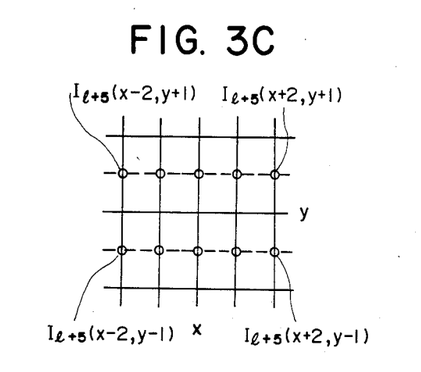

When the field "l" to be transmitted is output from the field memory 11, the data signals of the fields which are omitted during the transmission, i.e., l+2nd, l+4th, l+6th and l+8th fields are supplied to the multiplying circuits 21, 22, 23 and 24, respectively. An accumulating circuit including adding circuits 31, 32, 33 and 34 is connected to the corresponding multiplying circuits 21 to 24. Multiplying circuits 41, 42, 43, 44 are connected to the respective accumulating circuits 31 through 34.

from which the reference pixels are taken out is inverted with respect to the relationship of FIG. 3A.

In FIG. 3A to 3D, it is assumed that a line "Y" indicates a position where the corresponding pixel data of the field "k" is contained, a line "Y+1" is located just above the line "Y", a line "Y+2" is positioned above the line "Y+1", whereas the lines "Y−1" and "Y−2" are successively located under the line "Y".

In FIGS. 3A to 3D, the solid lines in the vertical direction indicate the sampling positions in the respective fields, the sampling position "X−1" corresponds to the sampling position preceding the sampling position "X" of the corresponding pixel data in the field "k", and the sampling position "X−2" corresponds to one previous the sampling position "X−1". Moreover, the sampling position "X+1" corresponds to the sampling position succeeding the above-defined sampling position "X", and also the sampling position corresponds to one following the sampling position "X+1".

The prediction data $\hat{I}k(x,y)$ regarding the corresponding pixel may be expressed by a linear combination between the reference pixels and the parameters in the following equation:

$$\begin{aligned}
Ik(x, y) = \;& w\hat{1} \times Il(x-2, y+2) + w2 \times Il(x-1, y+2) + \\
& w3 \times Il(x, y+2) + w4 \times Il(x+1, y+2) + w5 \times Il(x+2, y+2) + \\
& w6 \times Il(x-2, y) + w7 \times Il(x-1, y) + w8 \times Il(x, y) + \\
& w9 \times Il(x+1, y) + w10 \times Il(x+2, y) + w11 \times Il(x-2, y-2) + \\
& w12 \times Il(x-1, y-2) + w13 \times Il(x, y-2) + w14 \times Il(x+1, y-2) + \\
& w15 \times Il(x+2, y-2) + w16 \times Il+5(x-2, y+1) + w17 \times Il+5(x-1, y+1) + \\
& w18 \times Il+5(x, y+1) + w19 \times Il+5(x+1, y+1) + w20 \times Il+5(x+2, y+1) + \\
& w21 \times Il+5(x-2, y-1) + w22 \times Il+5(x-1, y-1) + w23 \times Il+5(x, y-1) + \\
& w24 \times Il+5(x+1, y-1) + w25 \times Il+5(x+2, y-1) + w26 \times Il+10(x-2, y+2) + \\
& w27 \times Il+10(x-1, y+2) + w28 \times Il+10(x, y+2) + w29 \times Il+10(x+1, y+2) + \\
& w30 \times Il+10(x+2, y+2) + w31 \times Il+10(x-2, y) + w32 \times Il+10(x-1, y) + \\
& w33 \times Il+10(x, y) + w34 \times Il+10(x+1, y) + w35 \times Il+10(x+2, y) + \\
& w36 \times Il+10(x-2, y-2) + w37 \times Il+10(x-1, y-2) + w38 \times Il+10(x, y-2) + \\
& w39 \times Il+10(x+1, y-2) + w40 \times Il+10(x+2, y-2)
\end{aligned}$$

Another accumulating circuit consisting of an adding circuit 4 is connected to the transposed matrix accumulating circuit 3 and an inverse matrix generating circuit 5 is connected to the output of this accumulating circuit.

Outputs derived from the inverse matrix generating circuit 5 are supplied to the multiplying circuits 41 to 44. These arithmetic operating circuits to which the data signals of the fields not transmitted are supplied, function as a circuit for identifying parameters by using the reference pixel data. Parameters w1 to w40 of the fields are output to respective output terminals 7, 8, 9 and 10. One field data signal transmitted within one period of the video data to be skipped is taken out from the output terminal 6. True data of one field and the parameters contained in four fields which are skipped are transmitted.

Figure 3D:
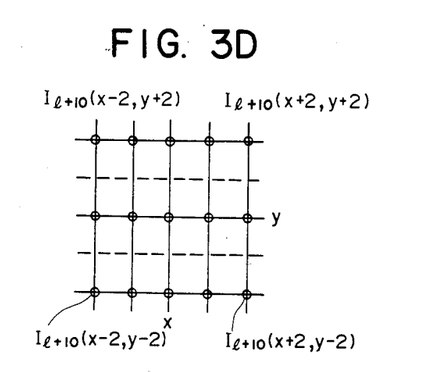

A prediction value with respect to the skipped image data of the field "k" (FIG. 3A) can be calculated as a linear combination of a total of 40 (forty) pixel data consisting of: neighbor 15 pixel data "Il" in the transmitted field "l" (see FIG. 3B); neighbor 10 pixel data in "Il+5" (see FIG. 3C); and neighbor 15 pixel data "Il+10" in the transmitted field "l+10" (see FIG. 3D).

It should be noted that the solid lines in the horizontal direction represent lines scanned in the odd-numbered fields, whereas the dashed lines in the horizontal direction indicate lines scanned in the even-numbered fields. If the pixels in question present in the even-numbered field are different from the example shown in FIG. 3A, the relationship between the odd field and the even field The above-described prediction equation implies that the prediction value concerning the pixel of the k-th field is obtained in such a manner that the neighbor pixels having the most significant correlation with respect thereto is derived as a representative value and then the representative value is corrected in the time spatial direction.

The parameter is identified by employing the reference pixel data by way of the method of least squares.

In other words, since a desired true value "Ik" of a certain pixel of the k-th field is equal to a value obtained by superimposing a prediction error "e" on the prediction value "$\hat{I}k$" of the pixel corresponding thereto in accordance with the above-defined equation, the prediction error "e" is obtained by subtracting the prediction value "$\hat{I}k$" from the true value "Ik". The parameters w1 to w40 are calculated in order to make the square sum of such a prediction error minimum with respect to a predetermined number of the pixels (will be discussed later). A description of identification of these parameters will be made later.

It should be understood that the highest precision of the image reproduction may be achieved if the parameters w1 through w40 are calculated by employing all of the pixels contained in one field based upon the method of least squares (e.g., in case of 800 pixels in one field consisting of 255 lines, 800×255 pixels in total). The entire circuit's scale however becomes large. Accordingly, these parameters w1 to w40 may be preferably identified, using a predetermined number of pixels, e.g., 300 pixels as representative pixels which have been skipped every plurality of samples.

Alternatively, one field is subdivided into two-dimensional subregions for the block-processing, so that the parameters may be calculated for each block region.

Figure 4:
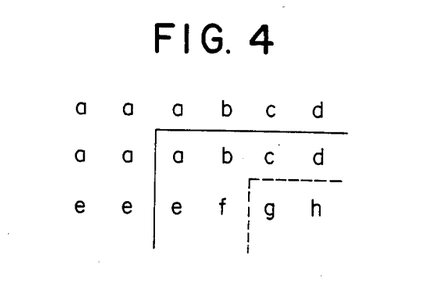

As illustrated in FIG. 4, in the periphery of the screen where no data is present, the same data as those "a" to "h" within the screen may be employed for this peripheral portion outside the screen. Moreover, as shown in FIG. 4 by the dotted line, the data identification may be alternatively performed in the region which is positioned within one line by two samples inside the peripheral portion of the screen.

A description will now be made of the identification of the parameters by utilizing the method of least squares.

The linear combination equation to calculate the above-described prediction data Ik (x,y) can be expressed by the following determinant in case of performing the prediction regarding the overall of one field.

$$\begin{bmatrix} \hat{I}k(x_1, y_1) \\ \hat{I}k(x_2, y_1) \\ \vdots \\ \hat{I}k(x_1, y_2) \\ \hat{I}k(x_2, y_2) \\ \vdots \\ \hat{I}k(x_m, y_n) \end{bmatrix} =$$

$$\begin{bmatrix} Il(x_1-2, y_1+2) & \ldots & Il+10(x_1+2, y_1-2) \\ Il(x_2-2, y_1+2) & \ldots & Il+10(x_2+2, y_1-2) \\ \vdots & & \vdots \\ Il(x_1-2, y_2+2) & \ldots & Il+10(x_1+2, y_2-2) \\ Il(x_2-2, y_2+2) & \ldots & Il+10(x_2+2, y_2-2) \\ \vdots & & \vdots \\ Il(x_m-2, y_n+2) & \ldots & Il+10(x_m+2, y_n-2) \end{bmatrix} \times \begin{bmatrix} w1 \\ w2 \\ \vdots \\ w40 \end{bmatrix}$$

If this determinant is simplified by use of a matrix and a vector, then $$\hat{\mathbf{I}} = I \cdot w$$

where, "$\hat{\mathbf{I}}$" is a vector of the (m x n)-th order, "I" is a matrix of (m×n, 40), and "w" is a vector of the 40th order.

On the other hand, a vector "$\hat{\mathbf{I}}$" consisting of arranged data (true values) in the k-th field is a vector of the (m×n)-th order. Assuming that "e" is a prediction error vector of the (m×n)-th order, the following equation is obtained;

$$\mathbf{I} = \hat{\mathbf{I}} + e = I \cdot w + e$$

Finally, it becomes:

$$e = \mathbf{I} - \hat{I} \cdot w$$

The parameters "w" can be derived which make the square sum of the prediction error vector "e" minimum. This equation is modified as follows.

$$e^T e = (\mathbf{I} - I w)^T (\mathbf{I} - I w) =$$

$$\mathbf{I}^T \mathbf{I} - w^T I^T \mathbf{I} - w^T I^T \mathbf{I} + w^T I^T I w$$

where, "T" is a transposed matrix.

In this equation, the parametes "w" which make $e^T e$ minimum can satisfy the following equation.

$$\frac{\partial(e^T e)}{\partial w} = -I^T \mathbf{I} + I^T I w = 0$$

As a result, $$\therefore w = (I^T I)^{-1} I^T \mathbf{I}$$

In case of all pixels (m×n) in one field, a very large matrix of (m×n, 40) is necessarily handled according to this equation, so that it is not a practical solution. In this embodiment, therefore, the above equation is modified to a matrix and a vector of smaller orders than the above order and then is processed. Namely, the matrix of (40, 40) of ($P = I^T \cdot I$) and the vector of the 40th-order of ($Q = I^T \cdot I$) are practically used.

$$P = \sum_{i=1 \sim m} \sum_{j=1 \sim m} \begin{bmatrix} Il(x_{i-2}, y_{j+2}) \\ Il(x_{i-1}, y_{j+2}) \\ \vdots \\ Il+10(x_{i+2}, y_{j-2}) \end{bmatrix}$$

$$\times [Il(x_{i-2}, y_{j+2}) Il(x_{i-1}, y_{j+2})$$

$$\ldots Il+10(x_{i+2}, y_{j-2})]$$

$$Q = \sum_{i=1 \sim m} \sum_{j=1 \sim n} \begin{bmatrix} Il(x_{i-2}, y_{j+2}) \\ Il(x_{i-1}, y_{j+2}) \\ \vdots \\ Il+10(x_{i+2}, y_{j-2}) \end{bmatrix} \times Ik(x_i, y_j)$$

Since ($P = I^T \cdot I$) is the matrix employing only the reference pixels, it is a common term to identify the parameters for four fields to be skipped. In the preferred embodiment, a calculation on ($I^T \cdot I$) is performed by the transposed matrix multiplying circuit 3 and thereafter the multiplication is carried out with respect to the overall field in the adder circuit 4, so that the term of the equation P can be calculated. In addition, the common term of $(I^T, I)^{-1}$ can be obtained by the inverse matrix generating circuit 5.

In the respective multiplying circuits 21, 22, 23 and 24, the reference pixels are multiplied by the pixels of the field to be skipped, so that the value of the vector Q for the respective fields can be derived from the outputs of the adder circuits 31 to 34 for accumulating the outputs of these multiplying circuits 21 to 24. As the above-described common term P is multiplied in the multiplying circuits 41 to 44 by the values of Q that have been obtained every field, the resultant parameter "w" is obtained from the output terminals 7 to 10 of the encoding apparatus shown in FIG. 1.

It should be noted that it may be possible to perform compression-encoding of the data of the respective transmission fields so as to reduce the quantity of the data.

Figure 5:
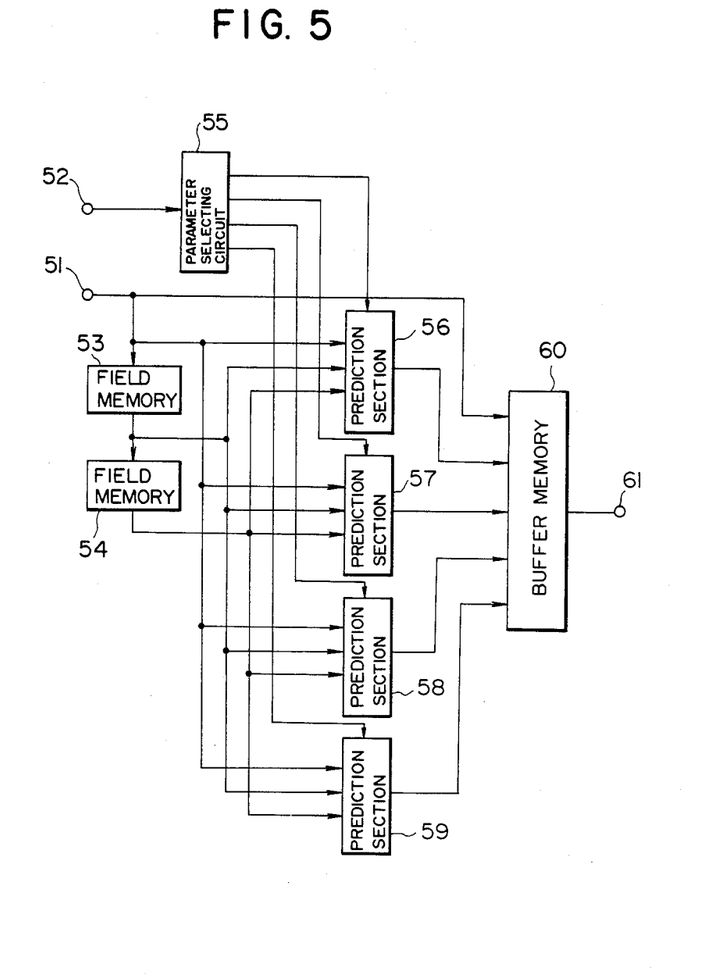
FIG. 5 is a schematic block diagram of a data receiver for receiving the transmission data encoded in the data transmitter shown in FIG. 1.

A decoding apparatus for receiving the above-mentioned encoded transmission data, as illustrated in FIG. 5, includes: field memories 53 and 54 to which the field data received by an input terminal 51 is supplied; a parameter selecting circuit 55 for accepting parameters w1 to w40 received via an input terminal 52; and prediction sections 56, 57, 58 and 59 to which the data of three fields (1), (1+5), (1+10) and the corresponding parameters derived from the parameter selecting circuit 55 are supplied.

Accordingly, the reproduced data of the fields which have been skipped during the data transmission, namely the desired digital television signal can be formed by these prediction sections 56 to 59. Then, both the digital television signal of the fields received via the input terminal 51 and the data of the fields reproduced in the prediction sections 56 to 59 are fed to a buffer memory 60. The sequence of the television signal supplied into this buffer memory 60 is rearranged to establish the correct television signal sequence. The resultant television signal is derived from an output terminal 61.

In accordance with the present invention, the quantity of the data transmission can be advantageously compressed by skipping the data of the fields at a predetermined period. Since the prediction parameters regarding the non-transmitted data of the fields are also transmitted, the image reproduction of the non-transmitted data can be effectively done at the receiving end. That is to say, the function of these parameters is to predict the pixels in question, based upon the neighbor reference pixels having the higher correlation with the above pixels. As a result, even if movement information of a plurality of moving objects is not transmitted, deterioration in the reproduced image due to the objects movement can be considerably prevented.

Further, no problem concerning a block strain can take place because compensation can be effected three-dimensionally from view of both time and space.

Comparison results of errors contained in the reproduced image with respect to the conventional and inventive data-skipping systems are represented in the below mentioned table I. It should be noted that the conventional data-skipping system employs a ½ data-skipping method the conventional system A is the system for substituting the data by the preceding frame, and he conventional system B is the system for interpolating the data by the averaged values of the preceding and succeeding frames. The present invention employs, for instance, a 1/5 data-skipping method as in the previous embodiment.

TABLE 1

| Errors | Conventional system A | Conventional system B | Present Invention |
|---|---|---|---|
| 30– | 443 | 48 | 6 |
| 20–29 | 865 | 280 | 131 |
| 15–19 | 1,014 | 477 | 279 |

TABLE 1-continued

| Errors | Conventional system A | Conventional system B | Present Invention |
|---|---|---|---|
| 10–14 | 2,202 | 1,180 | 809 |
| 9 | 623 | 455 | 324 |
| 8 | 1,041 | 553 | 443 |
| 7 | 1,119 | 698 | 597 |
| 6 | 1,630 | 944 | 864 |
| 5 | 1,690 | 1,359 | 1,337 |
| 4 | 3,153 | 1,964 | 2,190 |
| 3 | 4,212 | 3,467 | 4,329 |
| 2 | 10,520 | 9,516 | 12,449 |
| 1 | 28,667 | 33,302 | 35,742 |
| 0 | 28,897 | 32,112 | 26,855 |
| $\sigma^2$ | 25.4 | 9.4 | 6.6 |

It is apparent from the error variance $\sigma^2$ in the table I that the error contained in the reproduced image can be considerably reduced, although the present invention employs the 1/5 data-skipping method, as compared with the conventional data-skipping type compressed data transmission system.

What is claimed is:

1. An apparatus for transmitting video signals comprising:
   input means for receiving video data of sequential fields;
   memory means for storing the video data of a plurality of fields;
   parameters generating means for generating a predetermined number of respective parameters to specify a time spatial relation which is defined by a linear combination from reference pixel data of a plurality of non-adjacent, alternately odd and even fields to be periodically transmitted every predetermined number of fields and pixel data of a respective field to be skipped between said plurality of fields to be periodically transmitted, each being stored in said memory means; and
   means for transmitting the video data of said fields to be periodically transmitted every said predetermined number of fields and said respective parameters instead of the video data of said respective field to be skipped.

2. An apparatus for transmitting video signals according to claim 1, wherein the video data of one of said odd fields are transmitted together with said respective parameters defining a respective odd field to be skipped and the video data of one of said even fields are transmitted together with said respective parameters defining a respective even field to be skipped.

3. An apparatus for transmitting video signals according to claim 1, wherein the video data of at least ten fields are stored in said memory means.

4. An apparatus for transmitting video signals comprising:
   input means for receiving video data of sequential fields;
   memory means for storing the video data of a plurality of fields;
   parameter generating means for generating respective prameters to specify a time spatial relation which is defined by a linear combination from reference pixel data of a plurality of fields to be periodically transmitted every predetermined number of fields and pixel data of a respective field to be skipped between said plurality of fields to be periodically transmitted, each being stored in said memory means; and means for transmitting the video data of said fields to be periodically transmitted every said predetermined number of fields and said respective parameters instead of the video data of said respective field to be skipped;

wherein the video data of said plurality of fields are periodically transmitted every five fields.

5. An apparatus for transmitting video signals accorrding to claim 1, wherein said parameter generating means consists of an arithmetic operating circuit for obtaining said respective parameters to minimize the square sum of the prediction error between a prediction value and a true value of a respective pixel of said respective field to be skipped.

6. An apparatus for transmitting video signals comprising:

input means for receiving video data of sequential fields;

memory means for storing the video data of a plurality of fields;

parameter generating means for generating respective parameters to specify a time spatial relation which is defined by a linear combination from references pixel data of a plurality of fields to be periodically transmitted every predetermined number of fields and pixel data of a respective field to be skipped between said plurality of fields to be periodically transmitted, each being stored in said memory means; and means for transmitting the video data of said fields to be periodically transmitted every said predetermined number of fields and said respective parameters instead of the video data of said respective field to be skipped;

wherein said parameter generating means consists of means for extracting neighboring reference pixel data around respective pixels of a field to be skipped, first multiplying means for multiplying a matrix of neighbor reference pixel data and a transposed matrix thereof, first accumulating means for accumulating the result from said means for multiplying over a whole field, means for generating an inverse matrix of the result from said first accumulating means, second multiplying means for multiplying respective pixel data of fields to be transmitted and to be skipped, second accumulating means for accumulating the result from said second multiplying means, and third multiplying means for mutiplying the result from said means for generating the inverse matrix and second multiplying means.

7. Method for transmitting video signals comprising the steps of:

receiving video data of sequential fields;

storing the video data of a plurality of fields;

generating a predetermined number of respective parameters to specify a time spatial relation which is defined by a linear combination from reference pixel data of a plurality of non-adjacent, alternately odd and even fields to be periodically transmitted every predetermined number of fields and pixel data of a respective field to be skipped between said plurality of fields to be periodically transmitted; and transmitting the video data of said fields to be periodically transmitted every said predetermined number of fields and said respective parameters instead of the video data of said respective field to be skipped.

8. Method for transmitting video signals according to claim 7, wherein said step of transmitting includes the step of transmitting the video data of one of said odd fields together with said respective parameters defining a respective odd field to be skipped and the video data of one of said even fields together with said respective parameters defining a respective even field to be skipped.

9. Method for transmitting video signals accoring to claim 7, wherein said step of storing includes storing the video data of at least ten fields.

10. Method for transmitting video signals according to claim 7, wherein said step of generating includes the step of obtaining said respective parameters to minimize the square sum of the prediction error between a prediction value and a true value of respective pixels of said respective field to be skipped.

11. Method for transmitting video signals comprising the steps of;

receiving video data of sequential fields;

storing the video data of a plurality of fields;

generating respective parameters to specify a time spatial relation which is defined by a linear combination from reference pixel data of a plurality of fields to be periodically transmitted every predetermined number of fields and pixel data of a respective field to be skipped between said plurality of fields to be periodically transmitted; and transmitting the video data of said fields to be periodically transmitted every said predetermined number of fields and said respective parameters instead of the video data of said respective field to be skipped;

wherein said step of transmitting includes the step of transmitting periodically the video data of said plurality of fields every five fields.

12. An apparatus for decoding video signals comprising:

input means for receiving the video data of fields being periodically transmitted every predetermined number of fields and a predetermined number of respective parameters to specify a time spatial relation which is defined by a linear combination from reference pixel data of non-adjacent, alternately odd and even ones of said fields being periodically transmitted and pixel data of a respective field being skipped between said fields being periodically transmitted;

memory means for storing the data of said received video data of said fields being periodically transmitted; and prediction means for predicting pixel data of said respective field being skipped from said video data of said received video data of said fields being periodically transmitted and said respective parameters.

* * * * *

UNITED STATES PATENT AND TRADEMARK OFFICE
CERTIFICATE OF CORRECTION

PATENT NO. : 4,788,589

DATED : November 29, 1988

INVENTOR(S) : Tetsujiro Kondo

It is certified that error appears in the above-identified patent and that said Letters Patent is hereby corrected as shown below:

Column 4, line 18, after "position" insert --"X+2"--;
          line 25 (in equation) change "IK" to --$\hat{I}K$--;
          same line, change "w$\hat{i}$" to --wl--.

Column 6, line 2, change "I.w" to --I.$w$--;
          line 6, change "I.w" to --I.$w$--;
          line 12, change "(II-I)" to --(II-$I$w)--;
          same line, before "=" second occurence, inser --)--;
          line 14, change "$w^T I_{\Pi}$" first occurence, to --$II^T Iw$--;
          line 17, change "parametes" to --parameters--;
          line 25, change ".∴.w" to -- .∴.$w$--;
          line 33, "and the vector of the"
                    should not be in italics;
          line 40, change "1~m" to --1~n--.

UNITED STATES PATENT AND TRADEMARK OFFICE
CERTIFICATE OF CORRECTION

PATENT NO. : 4,788,589

DATED : November 29, 1988

INVENTOR(S) : Tetsujiro Kondo

It is certified that error appears in the above-identified patent and that said Letters Patent is hereby corrected as shown below:

Column 7, line 57, change "he" to --the--.

Column 8, line 29, change "parameters" to --parameter--.

Column 9, line 9, chang "corrding" to --cording--;
        line 24, change "references" to --reference--.

Signed and Sealed this

Twenty-second Day of August, 1989

*Attest:*

DONALD J. QUIGG

*Attesting Officer*            *Commissioner of Patents and Trademarks*